(12) United States Patent
Bocsanyi et al.

(10) Patent No.: US 9,080,581 B2
(45) Date of Patent: Jul. 14, 2015

(54) VALVE ASSEMBLY AND PNEUMATIC SEAT ADJUSTING DEVICE

(75) Inventors: Berthold Bocsanyi, Leinburg (DE); Erich Dörfler, Landsberg (DE)

(73) Assignee: Schukra Geraetebau GmbH, Berndorf (AT)

( * ) Notice: Subject to any disclaimer, the term of this patent is extended or adjusted under 35 U.S.C. 154(b) by 818 days.

(21) Appl. No.: 13/306,526

(22) Filed: Nov. 29, 2011

(65) Prior Publication Data

US 2012/0143108 A1    Jun. 7, 2012

(30) Foreign Application Priority Data

Dec. 3, 2010   (EP) .................................... 10015265

(51) Int. Cl.
*A61H 9/00*     (2006.01)
*F15B 13/08*    (2006.01)
*B60N 2/44*     (2006.01)

(52) U.S. Cl.
CPC .............. *F15B 13/081* (2013.01); *B60N 2/448* (2013.01); *B60N 2/4415* (2013.01)

(58) Field of Classification Search
CPC .............................. B60N 2/448; B60N 2/4415
USPC ......... 601/148–152; 297/284.1, 284.3, 284.6, 297/284.9, 284.11, DIG. 3; 137/351, 816, 137/819, 833, 884; 428/596, 641, 686
See application file for complete search history.

(56) References Cited

U.S. PATENT DOCUMENTS

| 3,747,594 | A  | * | 7/1973  | Bishop ........................... 601/93 |
| 6,098,000 | A  | * | 8/2000  | Long et al. ................. 297/284.6 |
| 2005/0242644 | A1 | * | 11/2005 | Bauer et al. ................. 297/284.3 |
| 2006/0217644 | A1 | * | 9/2006  | Ozaki et al. .................... 601/148 |
| 2009/0098407 | A1 |   | 4/2009  | Minegishi et al. |

FOREIGN PATENT DOCUMENTS

| DE | 4413657    | 11/1995 |
| DE | 10063478   | 7/2002  |
| EP | 1072465    | 1/2001  |
| GB | 2004577 A  | 4/1979  |
| GB | 2277084    | 10/1994 |

* cited by examiner

*Primary Examiner* — Quang D Thanh
(74) *Attorney, Agent, or Firm* — Michael Best & Friedrich, LLP

(57) ABSTRACT

A valve assembly comprises a housing and a plurality of valves disposed within the housing. The housing has a layered body which comprises a first layer and a second layer, which in combination define a fluid supply channel, a first plurality of fluid channels and a second plurality of fluid channels. Each valve of the plurality of valves may be in fluid communication with the fluid supply channel and respectively at least one fluid channel selected from the first plurality of fluid channels and the second plurality of fluid channels. The fluid supply channel partitions the layered body such that the first plurality of fluid channels is arranged on a first side relative to the fluid supply channel and that the second plurality of fluid channels is arranged on a second side opposite to the first side relative to the fluid supply channel.

15 Claims, 7 Drawing Sheets

VALVE ASSEMBLY AND PNEUMATIC SEAT ADJUSTING DEVICE

CROSS REFERENCE TO RELATED APPLICATIONS

This application claims the benefit of and priority to European Patent Application No. 10 10 015 265.1, filed Dec. 3, 2010, the entire contents of which are incorporated herein by reference.

BACKGROUND OF THE INVENTION

The invention relates to a valve assembly and to a seat adjusting device. The invention relates in particular to a valve assembly operative to supply a fluid, in particular a gas, to an inflatable chamber of a seat adjusting device.

Lumbar supports, side supports or other adjustable supports as well as massage units are frequently provided in seats to enhance an occupant's comfort when seated on the seat. Lumbar support devices are provided in backrests in order to provide adequate support in the lumbar vertebral or lordosis region of a person sitting on the seat by forming a suitable support surface. Side supports are provided on a backrest and/or on a seat portion to provide adjustable side support. The latter may be desirable not only to accommodate varying occupant sizes, but also to actively adjust lateral support in response to centrifugal forces. Massage units may be integrated into a seat to stimulate blood circulation and/or to further enhance occupant comfort.

Some implementations of seat adjusting devices utilize one or plural inflatable fluid chambers. The fluid chambers may be configured as inflatable cushions or bladders which change their shape and/or size in dependence on an amount of fluid contained therein. Examples for seats having lumbar support devices implemented using inflatable fluid chambers are described, for example in EP 1 072 465 A1 or in DE 100 63 478 A1. An adjustment of the adjustable support may be effected by means of a pressure source and a suitably configured pneumatic circuit comprising valves and connecting members, such as hoses.

The integration of an increasing number of adjustable components into a seat enhances sitting comfort. On the other hand, installation space available in the seat is limited. Further, the integration of an increasing number of actuators and associated componentry required to couple the actuator to a mechanically or pneumatically adjustable member leads to an increase of assembly time and, thus, assembly costs. While pneumatic elements, such as valves, may enhance life time of and/or comfort provided by the adjustable support device, such components may add to installation space and cost.

In order to address problems associates with installation space, installation time and installation cost, a plurality of valves can be assembled to form a valve battery, which may be pre-assembled prior to installation in a seat. DE 44 13 657 C1 describes an example for a valve battery having a modular configuration, with one valve being integrated into each module and plural modules being combined to form the valve battery.

In order to further reduce the number of components which need to be assembled, fluid channels may be integrated into a solid member of a valve battery housing. While this allows the time required for assembling the valve battery to be reduced, such a design may suffer from a reduced design flexibility. For illustration, for a given design of the valve battery housing, the configuration of channels formed in the valve battery housing may invariably determine the types of valves which may be installed in the housing. In consequence, it may be required to produce and supply different valve battery housings depending on whether 3/2-valves, 3/3-valves or 2/2-valves or specific combinations thereof are to be installed in the valve battery housing, which in turn adds to costs.

SUMMARY

There is a continued need in the art for a valve assembly which addresses some of the above needs. In particular, there is a continued need in the art for a valve assembly which has fluid channels incorporated into a housing, while allowing different types of valves and/or different combinations of such valves to be integrated into the valve assembly.

According to embodiments of the invention, this need is addressed by a valve assembly as defined by the independent claim. The dependent claims define embodiments.

According to an embodiment, a valve assembly is provided. The valve assembly comprises a housing and a plurality of valves disposed within the housing. The housing comprises a layered body. The layered body comprises a first layer and a second layer. The first layer and the second layer in combination define a fluid supply channel, a first plurality of fluid channels and a second plurality of fluid channels. Each one of the plurality of valves is in fluid communication with the fluid supply channel and respectively at least one fluid channel selected from the first plurality of fluid channels and the second plurality of fluid channels. The fluid supply channel partitions the layered body such that the first plurality of fluid channels is arranged on a first side relative to the fluid supply channel and that the second plurality of fluid channels is arranged on a second side opposite to said the side relative to the fluid supply channel.

In the valve assembly, various fluid channels are defined by the layered body, thereby reducing the number of fluid connections which must be separately installed. The arrangement with the first plurality of fluid channels and the second plurality of fluid channels being arranged on opposite sides relative to the fluid supply channel provides a housing with integrated fluid channels which affords a high degree of flexibility. Different types of valves may be integrated into the housing by allowing a valve to be selectively coupled to only one of the first plurality of fluid channels or the second plurality of fluid channels, or by alternatively allowing a valve to be coupled to both one of the first plurality of fluid channels and one of the second plurality of fluid channels. The valve assembly may be readily adapted to customer's needs by assembling the desired types and numbers of valves with the housing.

The plurality of valves may comprise a pair of valves and a 3/3-way valve. The layered body, the pair valves and the 3/3-way valve may be configured such that a first fluid channel selected from the first plurality of fluid channels and a second fluid channel selected from the second plurality of fluid channels are selectively engageable with either the pair of valves or the 3/3-way valve. The pair of valves may be a pair of 3/2-way valves, a pair of 2/2-way valves, or a combination of one 3/2-way valve and one 2/2-way valve.

By adapting the configurations of the pair of valves and of the 3/3-way valve such that either the pair of valves or the 3/3-way valve can be selectively associated with a pair of fluid channels disposed on opposite sides relative to the fluid supply channel, a high flexibility in assembling different types of valves in one valve assembly is attained.

According to another embodiment, a pneumatic seat adjusting device is provided. The seat adjusting device comprises the valve assembly of any one embodiment and a plurality of inflatable fluid chambers connected to the valve assembly. Each one of the inflatable fluid chambers may be in fluid communication with respectively one fluid channel selected from the first plurality of fluid channels or the second plurality of fluid channels.

Owing to the high degree of versatility afforded by the valve assembly, the valve assembly may be utilized in association with inflatable fluid chambers disposed at various locations on or in a seat. For illustration, the inflatable fluid chambers of a lumbar support may be in fluid communication with respectively one 3/3-way valve of the valve assembly. Alternatively or additionally, the inflatable fluid chambers of a side support may respectively be in fluid communication with respectively one 3/3-way valve of the valve assembly. Alternatively or additionally, a pair of inflatable fluid chambers forming a massage unit may be in fluid communication with a pair of 3/2-way valves or a pair of 2/2-way valves of the valve assembly. The housing does not need to be adapted when different types of valves are assembled in the valve assembly.

According to another embodiment, a seat is provided which includes the pneumatic seat adjusting device of any one embodiment.

The valve assembly according to various aspects and embodiments may be utilized for adjusting components of a seat, in particular in vehicle seating. For illustration, the valve assembly may be applied to a seat which includes a massage unit, or to a seat which includes both a massage unit and an adjustable lumbar support device, e.g., a two-way lumbar support or a four-way lumbar support, or to a seat which includes both a massage unit and an adjustable lumbar support device and an adjustable side support device or any combination thereof. The valve assembly may also be utilized for adjusting other components of a seat.

Embodiments of the invention will be described with reference to the accompanying drawings.

DETAILED DESCRIPTION

Figure 1:
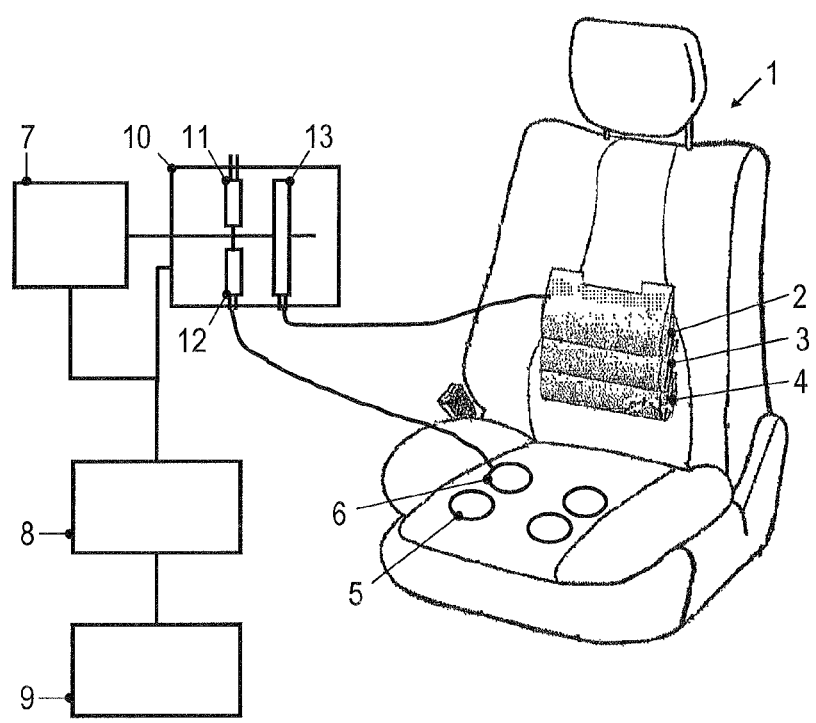
FIG. 1 is a schematic view of a seat having an adjusting device including a valve assembly according to an embodiment.

Exemplary embodiments of the invention will be described with reference to the drawings. While some embodiments will be described in the context of specific fields of application, such as in the context of automotive vehicle seating, the embodiments are not limited to this field of application. The features of the various embodiments may be combined with each other unless specifically stated otherwise.

According to embodiments, a valve assembly is provided which has a housing comprising a layered body, which defines a fluid supply channel, a first plurality of fluid channels and a second plurality of fluid channels, with the first and second plurality of fluid channels being arranged on opposite sides relative to the fluid supply channel. A plurality of valves is disposed within the housing, each valve having an inlet port in fluid communication with the fluid supply channel and at least one other port in fluid communication with at least one of the first plurality of fluid channels and the second plurality of fluid channels.

The plurality of valves may include at least one valve which has an inlet port in fluid communication with the fluid supply channel, a port in fluid communication with one fluid channel of the first plurality of fluid channels and a port in fluid communication with one fluid channel of the second plurality of fluid channels. The two fluid channels selected from the first and second pluralities of fluid channels may be arranged symmetrically relative to the fluid supply channel. By utilizing a valve which has a configuration such that it can be coupled to both one of the first fluid channels and one of the second fluid channels defined by the layered body, valve configurations are possible in which a valve is allowed to extend across the fluid supply channel, so as to couple to both one of the first fluid channels and to one of the second fluid channels.

The valve having ports in fluid communication with both one of the first plurality of fluid channels and one of the second plurality of fluid channels may be a 3/3-way valve. Such a valve may in particular be used in association with an inflatable fluid chamber used for adjusting a seat contour over extended time periods. Examples for such fluid chambers include a fluid chamber of a lumbar support or a fluid chamber of a side support.

The valve having ports in fluid communication with both one of the first plurality of fluid channels and one of the second plurality of fluid channels may be configured such that it can be rotated by 180° about an axis and can be coupled to the layered body in its rotated state. For illustration, the valve having ports in fluid communication with both one of the first plurality of fluid channels and one of the second plurality of fluid channels may have an outer shell which is essentially inversion symmetric relative to a symmetry axis. The symmetry axis may extend in a direction orthogonal to the longitudinal axis of the fluid supply channel, and in a direction orthogonal to a plane defined by the layered body. This configuration allows the valve having ports in fluid communication with both one of the first plurality of fluid channels and one of the second plurality of fluid channels to be installed in two different orientations, so that external ports of the valve assembly may be selectively assigned to be working ports to be connected to an inflatable fluid chamber or to be exhaust ports.

The plurality of valves may additionally or alternatively include a pair of valves, which are here referred to as a first valve and a second valve of the pair. The first valve and the second valve may respectively have an input port in fluid communication with the fluid supply channel. The first valve may have a fluid port in fluid communication with one of the first plurality of fluid channels. The second valve may have a fluid port in fluid communication with one of the second plurality of fluid channels. The two fluid channels selected from the first and second pluralities of fluid channels may be arranged symmetrically relative to the fluid supply channel. By utilizing such a pair of valves with the first valve coupling to one of the first plurality of fluid channels and the second valve coupling to one of the second plurality of fluid channels, additional valve functionalities may be integrated into the valve assembly. The fluid port of the first valve and the fluid port of the second valve may be arranged symmetrically relative to the input port.

For illustration rather than limitation, the first and second valve of the pair of valves may respectively be configured as 3/2-way valves or 2/2-way valves. 3/2-way valves may in particular be used in association with an inflatable fluid chamber in which it is generally not required to hold the amount of fluid introduced thereinto constant over extended time periods. Examples for such fluid chambers include fluid chambers of a massage unit.

If the pair of valves is a pair of 3/2-way valves, the 3/2-way valves may respectively have an exhaust port for discharging fluid. The exhaust ports may be enclosed within the housing, so that fluid is first discharged to a volume enclosed by the housing upon deflation of an inflatable fluid chamber. The layered body may define a flat noise damping compartment through which fluid discharged upon deflation of an inflatable fluid chamber is guided prior to exiting the housing of the valve assembly. The flat noise damping compartment may be provided with noise damping elements, such as a noise damping foam material or a compressed granular material.

The first and second valve of the pair of valves may be co-axially aligned. The inlet ports of the first valve and the second valve may face each other. Thereby, a compact design may be implemented.

The valve assembly may include both a pair of valves, e.g., a pair of 3/2-way valves or a pair of 2/2-way valves, and a valve having ports in fluid communication with both one of the first plurality of fluid channels and one of the second plurality of fluid channels. The valve having ports in fluid communication with both one of the first plurality of fluid channels and one of the second plurality of fluid channels may have an exterior shape which corresponds to, i.e., is essentially similar, to the one of the pair of 3/2-way valves.

The layered body may be configured such that the fluid supply channel defines a supply passage for supplying fluid to a valve or to a pair of valve. The layered body may further define an associated first passage for allowing fluid to pass into or out of one of the first plurality of fluid channels and an associated second passage for allowing fluid to pass into or out of one of the second plurality of fluid channels. The associated first passage and the associated second passage may be arranged in an inversion-symmetric manner relative to the supply passage. The associated first passage and the associated second passage may also be arranged in a mirror-symmetric manner relative to a center plane of the fluid supply channel. By virtue of such a symmetric configuration of the passages in the layered body, the installation of valves in different orientations on the layered body is facilitated. The supply passage, the first passage and the second passage may have longitudinal axes which respectively extend perpendicularly to a longitudinal axis of the fluid supply channel.

The layered body may define a plurality of mutually fluid-tight first compartments and a plurality of mutually fluid-tight second compartments. A first compartment selected from the plurality of first compartments and a second compartment selected from the plurality of second compartments may be mirror-symmetric relative to a virtual plane passing through the fluid supply channel or may be inversion-symmetric relative to a point located on this virtual plane. Thereby, installation of valves in different orientations is facilitated.

The first compartments may have identical conformations and may comprise respectively one of the first plurality of fluid channels. The second compartments may have identical conformations and may comprise respectively one of the second plurality of fluid channels. By forming such compartments, a repeating pattern of fluid channels is realized in the layered body, so that different types of valves may be assembled as needed for the specific application.

The fluid supply channel may have a linear portion and each fluid channel of the first plurality of fluid channels and of the second plurality of fluid channels may respectively have a linear portion extending transverse to the linear portion of the fluid supply channel.

The layered body may further comprise noise dampers associated with the first plurality of fluid channels and the second plurality of fluid channels. The noise dampers may be interposed between the first layer and the second layer of the layered body. By integrating noise dampers into the layered body, noise levels may be decreased without requiring the noise dampers to be installed separately from the layered body.

Further, the material and/or dimensions of the noise dampers may be selected depending on a desired time constant for inflation and/or deflation of the associated fluid chamber.

The housing may comprise a first side wall provided with a first plurality of connectors and a second side wall provided with a second plurality of connectors. The first and second side walls may be spaced from each other. Each connector of the first plurality of connectors may be in fluid communication with respectively one of the first plurality of fluid channels. Each connector of the second plurality of connectors may be in fluid communication with respectively one of the second plurality of fluid channels. Thereby, the passage of fluid through the various connectors may be readily controlled via the valve assembly.

The first side wall and the second side wall may be integrally formed with at least one of the first layer and the second layer of the layered body. Thereby, the number of components to be assembled may be decreased. Owing to the sandwich-structure of the layered body, a housing portion having the required recesses to implement one of the layers of the layered body can be readily formed, for example using various molding techniques.

The first layer and the second layer may be welded together along a plurality of weld lines. Thereby, fluid-tight channels can be readily formed.

The valve assembly may comprise at least one pressure sensor in direct fluid communication with at least one valve of the plurality of valves. This allows the pressure sensor to be mounted without requiring the installation of tubing.

The valve assembly may further comprise a calibrated pressure sensor in fluid communication with the fluid supply channel to sense a pressure therein. The at least one pressure sensor in direct fluid communication with at least one valve of the plurality of valves may be a non-calibrated pressure sensor. A control circuit may be coupled to both the calibrated pressure sensor and the non-calibrated pressure sensor and may perform a calibration on the output signals of the non-calibrated pressure sensor based on an output signal received from the calibrated pressure sensor. By using one or several non-calibrated pressure sensor(s), costs of the valve assembly may be decreased.

In any one embodiment described herein, the fluid may be a gas. The fluid may in particular be air.

Referring now to the drawings, embodiments will be described in more detail.

FIG. 1 is a schematic view of a vehicle seat 1 having an adjusting device which comprises a valve assembly according to an embodiment. The adjusting device includes inflatable fluid chambers configured as bladders. Some of the bladders may be such that it may be desirable to selectively increase, decrease or hold an amount of fluid introduced thereinto. This may be desirable when the bladder constitutes a mechanism for adjusting a seat contour over extended time periods, such as an adjustable lumbar support. Alternatively or additionally, some of the bladders may be configured such that the amount of fluid introduced thereinto is increased or decreased during operation, while the amount of fluid does not need to be kept constant at a pressure greater than ambient pressure over extended time period. This may be desirable for bladders constituting, for example, massage units where pressure in the bladders are continuously adjusted.

For illustration rather than limitation, the seat 1 is shown to include an adjustable lumbar support and massage units for stimulating blood circulation in an occupant's thighs. The lumbar support includes inflatable fluid chambers, which are configured as inflatable bladders 2, 3, 4. The bladders 2, 3, 4 are configured to change their exterior dimensions when a fluid pressure in the respective bladder is adjusted. Bladders 2, 3, 4 are provided at a lower portion of the backrest of the vehicle seat 1 and are offset relative to each other in a longitudinal direction of the backrest. By inflating or deflating all bladders 2, 3, 4, the amount of curvature in the lower backrest portion may be adjusted. By inflating one of the bladders 2, 3, 4 while deflating an other one, the apex position may be shifted. Thereby, a four-way lumbar support device may be implemented. The massage units are shown to respectively include a pair of bladders 5, 6 arranged in the seat portion of the seat 1. By inflating one of the bladders 5, 6 while deflating the other one of the bladders 5, 6, the top surface of the seat portion may be made to provide a pressure point moving in the fore-and-aft direction.

While a lumbar support device and massage units for the thigh region are shown in FIG. 1, the seat 1 may alternatively or additionally include adjusting devices arranged at other locations. Some of the bladders 2-6 illustrated in FIG. 1 may also be omitted. For illustration, instead of or in addition to the lumbar support device, bladders may be provided in side bolster portions of the seat to implement an adjustable side support. For further illustration, massage bladders may be provided on the backrest portion of the seat.

The adjusting device further includes a pressure fluid source 7, a valve assembly 10, a control circuit 8 and a manual control device 9. The pressure fluid source 7 is configured to provide a pressure fluid, in particular a gas, to the valve assembly 10. The pressure fluid source 7 may include a pump which supplies gas to the valve assembly 10. The valve assembly 10 is configured to receive the gas provided by the pressure fluid source 7 and to supply the gas to bladders installed in the seat 1. Actuation of the pressure fluid source 7 and of the valve assembly 10 may be controlled by the control circuit 8 which is electrically connected to the pressure fluid source 7 and the valve assembly 10.

The valve assembly 10 includes a plurality of valves 11-13. The valves are arranged in a housing of the valve assembly 10. The housing includes a layered body which defines fluid channels. The housing is configured such that different types of valves may be assembled in the housing and may be combined with the fluid channels defined by the housing, without requiring the housing as such to be adapted to the types of valves.

The valve assembly 10 may include at least a pair of valves 11, 12 which may be 3/2-way valves or 2/2-way valves. In implementations, a pair of 3/2-way valves may be provided for supplying fluid to a pair of bladders when it is not required to hold the amount of fluid introduced into the respective bladders at a constant pressure grater than ambient pressure over extended time periods. For illustration, the bladders 5 and 6 of a massage unit will be inflated and deflated in an alternating manner. The valve 12 is in fluid communication with the bladder 6 of the massage unit. Similarly, the valve 11 is in fluid communication with the bladder 5 of the massage unit via a suitable fluid line, such as a hose (not shown in FIG. 1).

The valve assembly 10 may further include at least one 3/3-way valve 13. In implementations, a 3/3-way valve may be provided for supplying fluid to a bladder when it is generally required to hold the amount of fluid introduced into the respective bladders constant at a pressure greater than ambient pressure over extended time periods. For illustration, for bladders 2, 3, 4 of the lumbar support or bladders of a side support, it is generally desired to alter the amount of fluid introduced into the bladder in accordance with an occupant's needs, and to then hold the amount of fluid at least approximately constant. The 3/3-way valve allows the amount of fluid introduced into the fluid chamber to be increased, to be decreased, or to be kept constant. The valve 13 is in fluid communication with the bladder 2 of the lumbar support. The valve assembly 10 will generally include additional valves in fluid communication with the bladders 3 and 4 of the lumbar support.

As schematically illustrated in FIG. 1, a 3/3-way valve 13 which is used for increasing, decreasing or holding constant the amount of fluid introduced into the fluid chamber associated with the valve has outer dimensions which correspond to the ones of a pair of valves 11, 12 which are respectively used for increasing or decreasing the amount of fluid introduced into the associated fluid chambers. As will be explained in more detail below, the configuration of the housing of the valve assembly 10 is such that either a pair of valves 11, 12 used for increasing or decreasing the amount of fluid introduced into the associated pair of fluid chambers or alternatively a valve 13 used for increasing, decreasing or holding constant the amount of fluid introduced into the associated fluid chamber may be coupled to the fluid channels defined by housing at any one of plural locations provided for installing valves.

The housing of the valve assembly and the valve 13 used for increasing, decreasing or holding constant the amount of fluid introduced into the associated fluid chamber may be configured such that the valve 13 can be mounted in the housing in two different orientations. The two different orientations may be such that the 3/3-way valve 13 may be rotated by 180° degrees about an axis perpendicular to a longitudinal axis of the valve 13. Thereby, the lateral side of the valve assembly 10 at which the hose connecting the valve 13 to the bladder 2 has to be mounted may be freely selected as desired for a given seat design. Design can thus be optimized with a view to reducing the installation space required for tubing or similar, and/or with a view to reducing excessive curvature in fluid lines.

While not shown in FIG. 1, the valve assembly may alternatively or additionally also include valves which establish fluid communication between a bladder and a common fluid supply channel and at least one valve for venting the fluid supply channel, to bring the fluid supply channel to ambient pressure. The valves may be used to, in combination, increase, hold constant or decrease the amount of fluid introduced into the respective fluid chamber. For illustration rather than limitation, the valve assembly may include a pair of 2/2-way valves respectively associated with right or left side bladders installed in a lower seat portion. The valve assembly may include another pair of 2/2-way valves respectively associated with right or left side bladders installed in a backrest portion. The valve assembly may include another pair of 2/2-way valves having a port at ambient pressure for allowing the side bladders to be vented via a common fluid supply channel.

The configuration of the valve assembly 10 according to an exemplary embodiments will next be described with reference to FIGS. 2-10.

Figure 2:
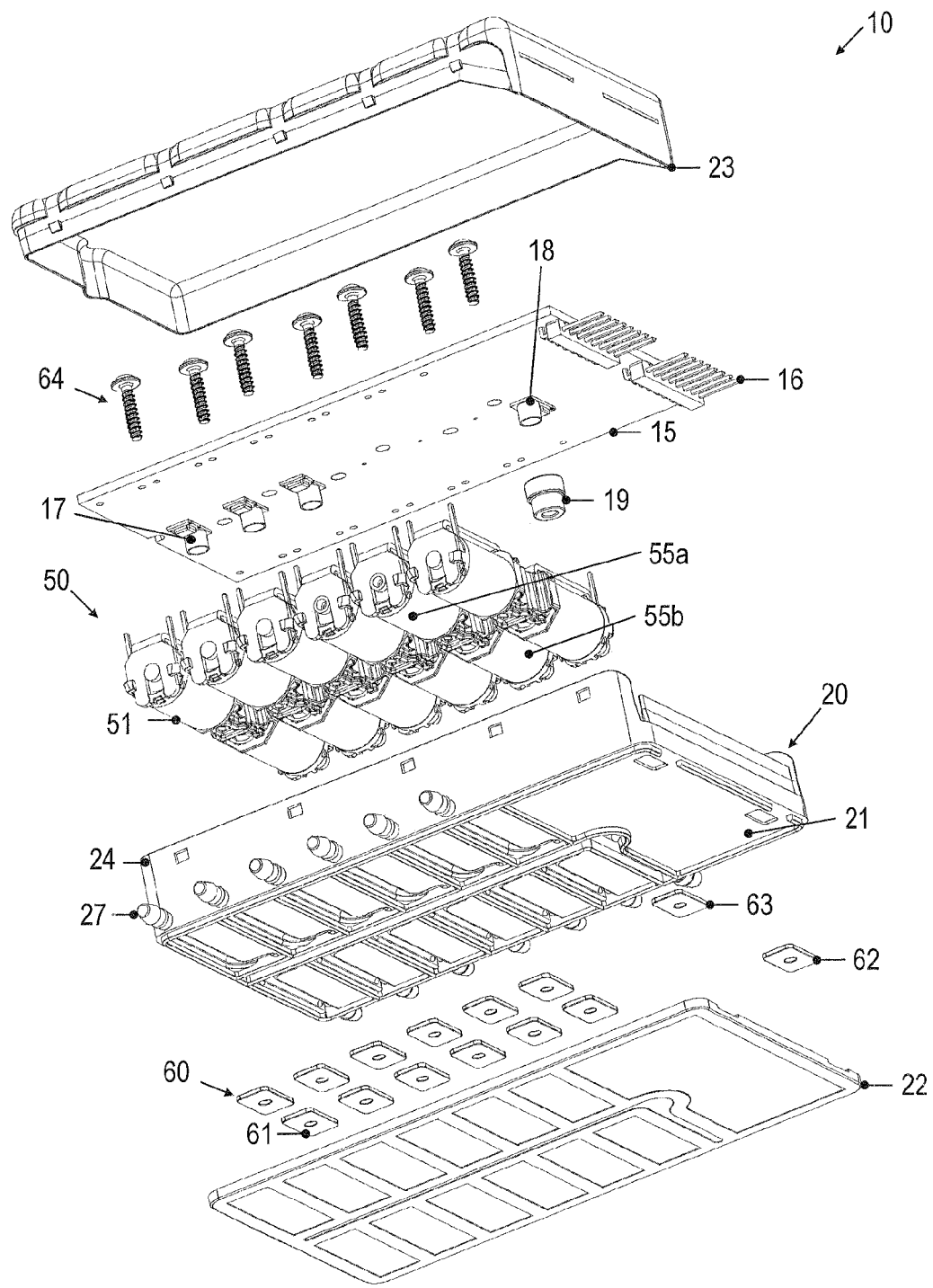
FIG. 2 is an exploded perspective view of a valve assembly according to an embodiment.

FIG. 2 is an exploded perspective view of the valve assembly 10. The valve assembly 10 includes a housing having a main housing portion 20, an end portion 23, and a closure plate 22. The valve assembly 10 includes a plurality of valves 50. The valve assembly 10 includes a circuit board 15, to which the valves 50 may be attached using fasteners 64. The circuit board 15 has connectors 16 for energizing the valves 50 and/or for supplying power and control signals to the valves 50.

The housing portion 20 includes a major face 21 which serves as a first layer 21 of a layered body of the housing. The first layer 21 of the layered body includes a plurality of recesses to define fluid channels. The first layer 21 further includes ridges projecting from the major face for joining the first layer 21 and the closure plate 22, which serves as second layer 22 of the layered body.

When joined to each other, the first layer 21 and the second layer 22 form a layered body having a sandwich-structure. The layered body defines a plurality of fluid channels which are interposed between and bounded by the first layer 21 and the second layer 22. The layered body defines a fluid supply channel through which fluid is supplied to the valves 50 in use of the valve assembly. The structure of the layered body and of the fluid channels formed therein will be described in more detail with reference to FIGS. 3-10.

A plurality of noise dampers 60 are interposed between the first layer 21 and the second layer 22. The noise dampers 60 may have various configurations, including foam pads or compressed granular material, without being limited thereto. The noise dampers 60 may include noise dampers 61 affixed in compartments defined by the first layer 21 and the second layer 22. The fluid may pass the noise damper 61 upon passage between a valve and an associated fluid chamber. The noise dampers 61 arranged in different compartments defined by the layered body may have different configurations so as to provide different fluid resistances to the fluid. Thereby, the time constants for inflating or deflating the different inflatable fluid chambers may be adjusted using different noise dampers.

The noise dampers 60 may include additional noise dampers 62, 63 which may also be interposed between the first layer 21 and the second layer 22, but may not be associated with any particular valve. For illustration, the additional noise dampers 62, 63 may be arranged in a flat noise damper compartment through which gas output by different ones of the valves 50 is guided when the associated fluid chamber is deflated.

The main housing portion 20 includes side walls 24 and 25 (not seen in FIG. 2), which are spaced from each other. The side walls 24, 25 and the major face which serves as first layer 21 are integrally formed. On the side walls 24, 25, connectors 27 for establishing a fluid connection between the valve assembly 10 and an inflatable fluid chamber are provided. The connectors are respectively associated and in fluid communication with a fluid channel defined between the first layer 21 and the second layer 22.

The plurality of valves 50 may all be of the same type. Alternatively, the valves 50 may include valves of different types and having different constructions. For illustration, the plurality of valves 50 may include a 3/3-way valve 51. The plurality of valves 50 may additionally include a pair of 3/2-way valves 55a and 55b. As will be described in more detail, the pair of 3/2-way valves 55a and 55b in combination has outer dimensions which are similar to the ones of the 3/3-way valve. Other combinations of valves and other types of valves may be utilized. For illustration, the plurality of valves 50 may include at least one pair or several pairs of 2/2-way valves.

The valves 50 may be attached on the circuit board 15. The circuit board 15 may include conductive traces electrically coupled with the plurality of valves 50. The circuit board 15 may define a repeating pattern of connection portions at which a valve or pair of valves may be electrically coupled with the circuit board 15.

At least one of the valves 50 may have a pressure sensor 17 associated with it. In an exemplary implementation, at least some of the 3/3-way valves may have an associated pressure sensor 17. The valve and associated pressure sensor 17 may be configured such that the pressure sensor 17 can be brought into direct fluid communication with the valve, without requiring any tubing separate from the valve and the pressure sensor 17 to establish a fluid connection therebetween. The pressure sensor 17 may be a non-calibrated pressure sensor.

The valve assembly 10 may further include a pressure sensor 18 in fluid communication with the fluid supply channel which is defined between the first layer 21 and the second layer 22. The pressure sensor 18 may be coupled to the fluid supply channel via a connector body 19. The connector body 19 may be formed from a plastic material, in particular from rubber. The connector body 19 may be formed from plastic. The pressure sensor 18 may be a calibrated pressure sensor. When the valve assembly includes at least one calibrated pressure sensor and at least one non-calibrated pressure sensor, the control circuit 8 coupled to both the non-calibrated pressure sensor 17 and the calibrated pressure sensor 18 may utilize the output signals of the calibrated pressure sensor 18 in combination with the output signal of a non-calibrated pressure sensor 17, in a state in which the respective non-calibrated pressure sensor 17 is in fluid communication with the fluid supply channel, to calibrate the output signals of the non-calibrated pressure sensor 17.

Figure 3:
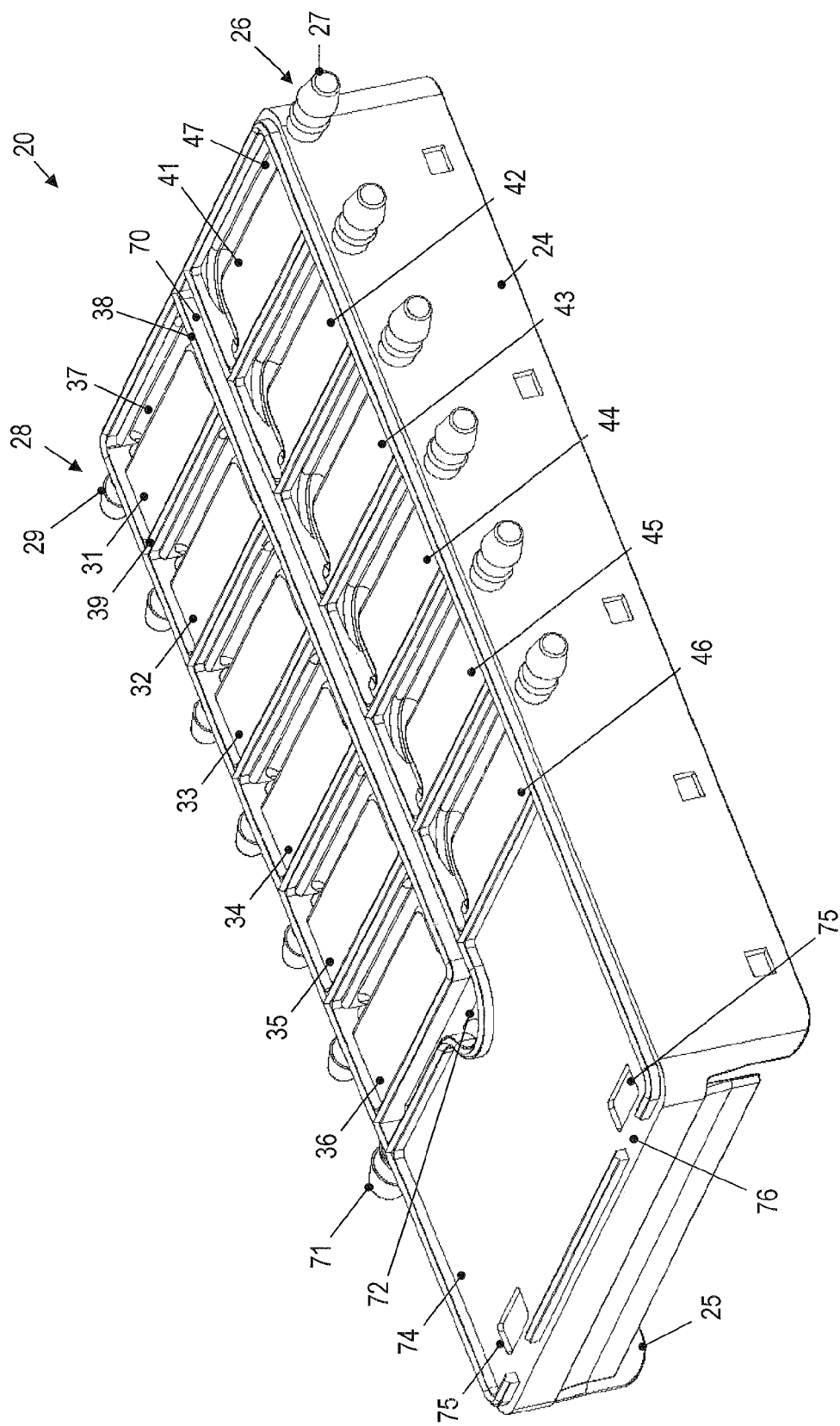
FIG. 3 is a perspective view of a main housing portion of the valve assembly of FIG. 2 on which a first layer of a layered body is formed.
Figure 4:
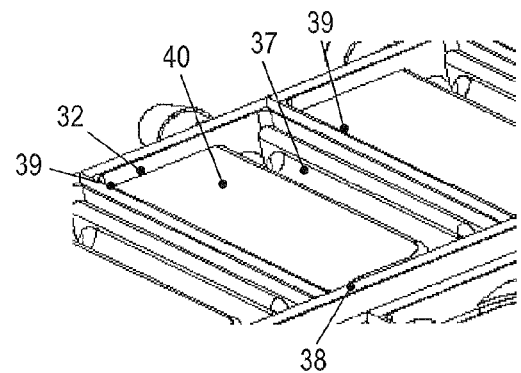
FIG. 4 is an enlarged detail view illustrating a section defined by the main housing portion of FIG. 3.

FIG. 3 shows the main housing portion 20 in more detail, and FIG. 4 is a detail view illustrating a compartment defined by the layered body. The main housing portion 20 is illustrated with the side forming the first layer 21 of the layered body facing upward in FIGS. 3 and 4, i.e., the viewing direction is inverted as compared to FIG. 2.

The major face of the main housing portion 20 which serves as the first layer 21 of the layered body is provided with a structured surface. The first layer 21 has a recess which defines a fluid supply channel 70. Joining ridges 38 extend on lateral sides of the fluid supply channel 70 towards the second layer 22. The first layer 21 and the second layer 22 are joined along the joining ridges 38 in a fluid-right manner. For illustration rather than limitation, the first layer 21 and the second layer 22 may be joined by various techniques, such as welding or similar. The fluid supply channel 70 has a linear portion which extends parallel to a longitudinal axis of the main housing portion 20. The linear portion of the fluid supply channel 70 may extend along a center axis of the main housing portion 20. The fluid supply channel 70 is in fluid communication with a connector 71. When installed, the connector 71 is in fluid communication with the pressure fluid source 7.

The fluid supply channel 70 may be provided with an extension 72 which defines a chamber having a cross-sectional area grater than that of the linear portion of the fluid supply channel 70. This extension 72, when present, may be in fluid communication with the pressure sensor 18 via the connector 19. The extension 72 defining a chamber integrated into the housing allows pressure fluctuations to be reduced when an output signal of the pressure sensor 18 is processed for sensing the pressure in the fluid supply channel.

The fluid supply channel 70 is provided to supply fluid to the plurality of valves 50. The valves 50 respectively have an input port in fluid communication with the fluid supply channel 70, as will be described in more detail with reference to FIGS. 8-10.

The first layer 21 also has a plurality of first recesses disposed on a first side relative to the fluid supply channel 70. The plurality of first recesses defines a plurality of first compartments 31-36 when the first layer 21 and the second layer 22 are joined together. Joining ridges 39 extend between the first compartments towards the second layer 22. The first layer 21 and the second layer 22 are joined along the joining ridges 39 in a fluid-right manner.

The plurality of first recesses formed in the first layer 21, and thus the plurality of first compartments 31-36 defined by the layered body, are disposed adjacent to each other along the longitudinal axis of the linear portion of the fluid supply channel 70. The first recesses formed in the first layer 21, and thus the first compartments 31-36 defined by the layered body, may have identical configurations. This allows any particular valve of the valves 50 to be installed at any one of a plurality of locations defined by fluid passages in the first layer 21, as will be described in more detail with reference to FIGS. 8-10.

Each one of the first compartments 31-36 includes a recess forming a fluid channel 37 in the layered body. The fluid channels 37 disposed in the plurality of first compartments 31-36 define a first plurality of fluid channels. As best seen in FIG. 4, the fluid channel 37 includes a recess extending along a direction transverse to the longitudinal axis of the linear portion of the fluid supply channel 70. The fluid channel 37 is in fluid communication with one of a plurality of fluid ports 28 formed on the side wall 25. For illustration, the recess forming the fluid channel 37 in the compartment 31 is in fluid communication with a fluid port designated at 29 in FIG. 3.

The first layer 21 also has a plurality of second recesses disposed on a second side relative to the fluid supply channel 70, which is opposite to the first side. The plurality of second recesses defines a plurality of second compartments 41-46 when the first layer 21 and the second layer 22 are joined together. Joining ridges extend between the second compartments towards the second layer 22. The first layer 21 and the second layer 22 are joined along the joining ridges in a fluid-right manner, so that the second compartments 41-46 are mutually fluid-tight.

The plurality of second recesses formed in the first layer 21, and thus the plurality of second compartments 41-46 defined by the layered body, are disposed adjacent to each other along the longitudinal axis of the linear portion of the fluid supply channel 70. The second recesses formed in the first layer 21, and thus the second compartments 41-46 defined by the layered body, may have identical configurations. This allows any particular valve of the valves 50 to be installed at any one of a plurality of locations defined by fluid passages in the first layer 21, as will be described in more detail with reference to FIGS. 8-10.

Each second compartment 41-46 has a configuration which is symmetric to that of a first compartment 31-36. Different symmetries may be realized. As illustrated in FIG. 3, a first compartment 31 and associated second compartment 41 disposed on opposite sides relative to the fluid supply channel 70 may be mirror-symmetric relative to a virtual mirror plane which corresponds to the center plane of the linear portion of the fluid supply channel 70 so as to be orthogonal to the plane defined by the first layer 21. In an alternative embodiment, a first compartment and associated second compartment may be inversion-symmetric relative to an inversion point located on the center plane of the linear portion of the fluid supply channel 70.

Each one of the second compartments includes a recess forming a fluid channel 47 in the layered body. The fluid channels 47 disposed in the plurality of second compartments 41-46 define a second plurality of fluid channels. The fluid channel 47 includes a recess extending along a direction transverse to the longitudinal axis of the linear portion of the fluid supply channel 70. The fluid channel 47 is in fluid communication with one of a plurality of fluid ports 26 formed on the side wall 24. For illustration, the recess forming the fluid channel 47 in the compartment 41 is in fluid communication with a fluid port designated at 27 in FIG. 3.

The first layer 21 further has an extended portion 74. The portion 74 is surrounded by ridges extending from the plane of the first layer 21 towards the second layer 72. The first layer 21 and the second layer 22 are joined together along the ridges in a fluid-tight manner. The portion 74 and the opposing portion of the second layer 22 form a noise damper compartment. The portion 74 includes at least one through opening 75. When an inflatable fluid chamber connected to a 3/2-way valve of the valve assembly is deflated, fluid may be guided from within the housing to the noise damper compartment bounded by the extended portion 74 through the through opening 75. The fluid may then exit the housing of the valve assembly through cut-outs 76 formed in the ridges surrounding the portion 74. The noise damping elements 62 and 63 illustrated in the exploded view of FIG. 2 may be disposed to cover the through openings 75.

The layered body formed by the first layer 21 and the second layer 22 defines the fluid supply channel 70, a plurality of mutually fluid-tight first compartments 31-36 each having a fluid channel 37 in fluid communication with respectively one of the connectors 28, and a plurality of mutually fluid-tight second compartments 41-46 each having a fluid channel 47 in fluid communication with respectively one of the connectors 26.

The first layer 21 defines fluid passages which allow fluid to pass from the fluid supply channel 70 to valves of the valve assembly. The first layer 21 also defines fluid passages which allow fluid to pass between a valve to respectively one of the first plurality of fluid channels 37. The first layer 21 also defines fluid passages which allow fluid to pass between a valve and respectively one of the second plurality of fluid channels 47. These fluid passages may be arranged such that a pair of a fluid passage which allows fluid to pass between a valve and respectively one of the first plurality of fluid channels 37 and a fluid passage which allows fluid to pass between a valve and respectively one of the second plurality of fluid channels 47 are arranged symmetrically relative to a center plane of the fluid supply channel and/or symmetrically relative to a fluid passage which allows fluid to pass from the fluid supply channel 70 to a valve.

Figure 5:
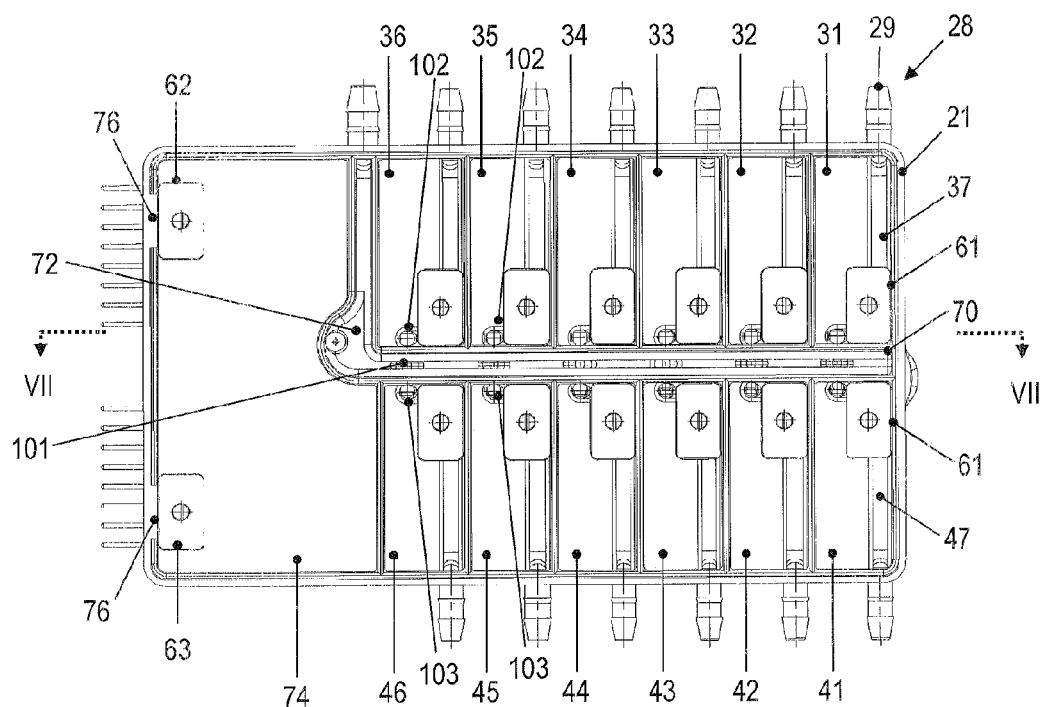
FIG. 5 is a plan view of the valve assembly of FIG. 2 with a second layer of the layered body removed.

FIG. 5 is a plan view of the valve assembly with the second layer 22 removed. As illustrated for the first compartment 36, the fluid passage 102 which allows fluid to pass between a valve and the fluid channel 37 disposed in the first compartment 36 is formed as a through hole in the first layer 21. The fluid passage 103 which allows fluid to pass between a valve and the fluid channel 47 disposed in the second compartment 46 is formed as a through hole in the first layer 21. The supply passage 101 which allows fluid to pass between the fluid supply channel 70 and a valve is also formed as a through hole in the first layer 21. The fluid passages 102 and 103 may be arranged symmetrically relative to the supply passage 101.

The arrangement of fluid passages 102 and 103 and associated supply passage 101 is respectively identical for the various first compartments 31-36 and second compartments 41-46, with a corresponding offset along the linear portion of the fluid supply channel 70.

The noise damper 61 is respectively attached to the first layer 21 in the first compartments 31-36 and in the second compartments 41-46. The noise damper 61 may be formed from a foam material, a compressed granular material, or another suitable material. The noise damper 61 is arranged such that fluid passing between the connectors formed on the wall of the main housing portion 20 and the fluid passages 101 or 102, respectively, passes along or through the noise damper 61. The noise damper 61 may have properties adapted to the respective compartments 31-36 or 41-46 in which it is to be disposed, so that time constants associated with inflation or deflation of inflatable fluid chambers may be set by selecting an appropriate noise damper 61. The size, material and density of the noise damper 61 may be set so as to attain a desired fluid resistance.

As will be described in more detail below, when an inflatable fluid chamber is to be inflated, fluid is passed from a valve to the respective fluid chamber through one of the fluid channels which is integrated into the layered body of the valve assembly housing. The valve may be a 3/3-way valve, a 3/2-way valve or a 2/2-way valve, depending on customer requirements and the constraints imposed by the inflatable fluid chamber.

If the plurality of valves 50 includes a 3/3-way valve, the 3/3-way valve may have three fluid ports interfacing the 3/3-way valve with fluid passages formed in the layered body. The 3/3-way valve may have a fluid port interfacing with one of the fluid passages 102 which allows fluid to pass to one of the first plurality of fluid channels 37, a fluid port interfacing with one of the fluid passages 103 which allows fluid to pass to one of the second plurality of fluid channels 47, and an inlet port interfacing with one of the supply passages 101. The three fluid ports interfacing the 3/3-way valve with the layered body have a given geometrical arrangement with lateral offsets defined by the arrangement of the supply passage 101 and associated first and second fluid passages 102 and 103, respectively.

If the plurality of valves 50 includes a pair of 3/2-way valves, the pair of 3/2-way valves in combination may also have three fluid ports interfacing the pair of 3/2-way valves with fluid passages formed in the layered body. The pair of 3/2-way valves may have a fluid port interfacing with one of the fluid passages 102 which allows fluid to pass to one of the first plurality of fluid channels 37, a fluid port interfacing with one of the fluid passages 103 which allows fluid to pass to one of the second plurality of fluid channels 47, and an inlet port interfacing with one of the supply passages 101. The pair of 3/2-way valves may have additional fluid ports for discharging fluid from inflatable fluid chambers to a volume enclosed by the housing. The three fluid ports interfacing the pair of 3/2-way valves with the layered body have a geometrical arrangement which may be identical to the geometrical arrangement of ports interfacing a 3/3-way valve of the valve assembly with the layered body. The three ports interfacing the pair of 3/2-way valves with the layered body may have lateral offsets defined by the arrangement of the supply passage 101 and associated first and second fluid passages 102 and 103, respectively.

If the plurality of valves 50 includes a pair of 2/2-way valves, the pair of 2/2-way valves in combination may also have three fluid ports interfacing the pair of 2/2-way valves with fluid passages formed in the layered body. The pair of 2/2-way valves may have a fluid port interfacing with one of the fluid passages 102 which allows fluid to pass to one of the first plurality of fluid channels 37, a fluid port interfacing with one of the fluid passages 103 which allows fluid to pass to one of the second plurality of fluid channels 47, and an inlet port interfacing with one of the supply passages 101. The pair of 2/2-way valves may have additional fluid ports for discharging fluid from inflatable fluid chambers to a volume enclosed by the housing. The three fluid ports interfacing the pair of 2/2-way valves with the layered body have a geometrical arrangement which may be identical to the geometrical arrangement of ports interfacing a 3/3-way valve of the valve assembly with the layered body. The three ports interfacing the pair of 2/2-way valves with the layered body may have lateral offsets defined by the arrangement of the supply passage 101 and associated first and second fluid passages 102 and 103, respectively.

Further, not only the fluid ports for interfacing the 3/3-way valve or a pair of 3/2-way valves or a pair of 2/2-way valves with the layered body, but also the respective electrical connectors may be arranged in an identical manner on the different types of valves. The 3/3-way valve may have electrical connectors for connecting the 3/3-way valve to the circuit board, the electrical connectors having a pre-defined arrangement. If the plurality of valves 50 includes a pair of 3/2-way valves, the pair of 3/2-way valves in combination may also have electrical connectors arranged in the same pre-defined arrangement. If the plurality of valves 50 includes a pair of 2/2-way valves, the pair of 2/2-way valves in combination may also have electrical connectors arranged in the same pre-defined arrangement.

The above configuration allows one or several 3/3-way valves, one or several pair(s) of 3/2-way valves and/or one or several pair(s) of 2/2-way valves to be combined in the valve assembly. The above configuration allows the different types of valves to be respectively positioned as desired so as to communicate with a selected pair of a first fluid compartment 31-36 and an opposing second fluid compartment 41-46.

Figure 6:
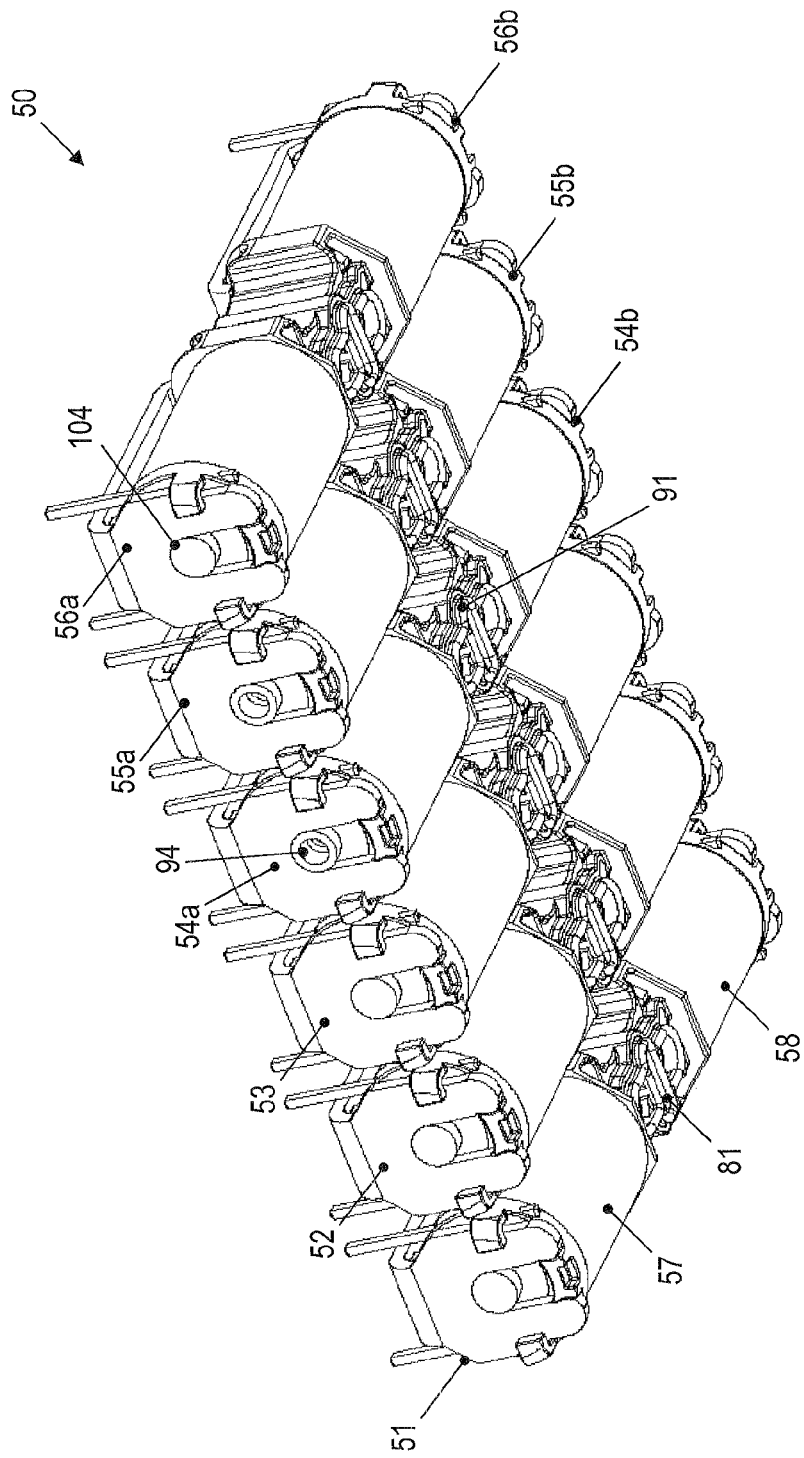
FIG. 6 is a perspective view of a plurality of valves of the valve assembly of FIG. 2.

FIG. 6 shows an exemplary plurality of valves 50 which may be utilized in a valve assembly of an embodiments. The plurality of valves 50 includes a 3/3-way valve 51, another 3/3-way valve 52, another 3/3-way valve 53, a pair of 3/2-way valves 54a and 54b, another pair of 3/2-way valves 55a and 55b, and a pair of 2/2-way valves 56a and 56b. Other combinations of valves may be used, depending on the number of inflatable fluid chambers which are to be supplied with fluid and/or depending on a number of fluid chambers which are to be kept at constant pressure over extended time periods.

The 3/3-way valve has exterior dimensions which essentially correspond to the exterior dimensions of the pair of 3/2-way valves or to the exterior dimensions of the pair of 2/2-way valves. Variations in exterior dimensions are tolerable as long as they allow the 3/3-way valve, the pair of 3/2-way valves and/or the pair of 2/2-way valves or a combination thereof to be positioned adjacent to each other along the longitudinal axis of the fluid supply channel 70 so as to respectively interface with one of the first compartments 31-36 and one of the second compartments 41-46.

The 3/3-way valve may include two portions 57, 58, which respectively include an electromagnetic actuator. The actuator included in the two portions 57, 58 may include a solenoid. The two portions 57, 58 are in fluid communication via a center portion 81 disposed between the two portions 57 and 58. The 3/3-way valve including the two portions 57, 58 respectively having an actuator and the center portion 81 may be formed as an integral unit. The center portion 81 may define the inlet port of the 3/3-way valve interfacing the 3/3-way valve with the fluid supply channel, a fluid port for interfacing the 3/3-way valve with one fluid channel 37 disposed in one of the first plurality of compartments 31-36, and another fluid port for interfacing the 3/3-way valve with one fluid channel 47 disposed in one of the second plurality of compartments 41-46.

The pair of 3/2-way valves includes a first 3/2-way valve 54a, a second 3/2-way valve 54b and a center portion 91. The 3/2-way valves 54a, 54b and the center portion 91 may be formed as an integral unit. The center portion 91 may define a common inlet port of the two 3/2-way valves 54a, 54b. The center portion 91 may further define a port of the first 3/2-way valve 54a in fluid communication with one fluid channel 37 disposed in one of the first plurality of compartments 31-36. The center portion 91 may also define a port of the second 3/2-way valve 54b in fluid communication with one fluid channel 47 disposed in one of the second plurality of compartments 41-46. Each one of the 3/2-way valves has another port 94 to discharge fluid. The fluid port 94 is disposed within the housing of the valve assembly so that fluid discharged from one of the inflatable fluid chambers via one of the 3/2-way valves is output to a volume enclosed by the housing of the valve assembly. The fluid may be guided through the noise damper compartment 74 and through the cut-outs 76 to the exterior of the valve assembly, in order to reduce noise levels.

Similarly, a pair of 2/2-way valves may include first and second valves 56a and 56b, respectively, and a center portion 91. The 2/2-way valves 56a, 56b and the center portion 91 may be formed as an integral unit. The 2/2-way valves may be configured similarly to the 3/2-way valves, but have a closure member 104 at the location at which the 3/2-way valve has the fluid port 94.

In the installed state, a valve may be connected, via one of the first or second fluid channels and a connecting member attached to the associated connector 26 or 28, to one inflatable fluid chamber. A 3/3-way valve, such as valve 51, has a fluid port in fluid communication with a fluid channel disposed in one of the first plurality of compartments 31-36 and a fluid port in fluid communication with a fluid channel disposed in one of the second plurality of compartments 41-46. A 3/3-way valve may require the same amount of installation space in the valve assembly as two 3/2-way valves, two 2/2-way valves or a pair of 3/2-way valve and 2/2-way valve.

Figure 7:
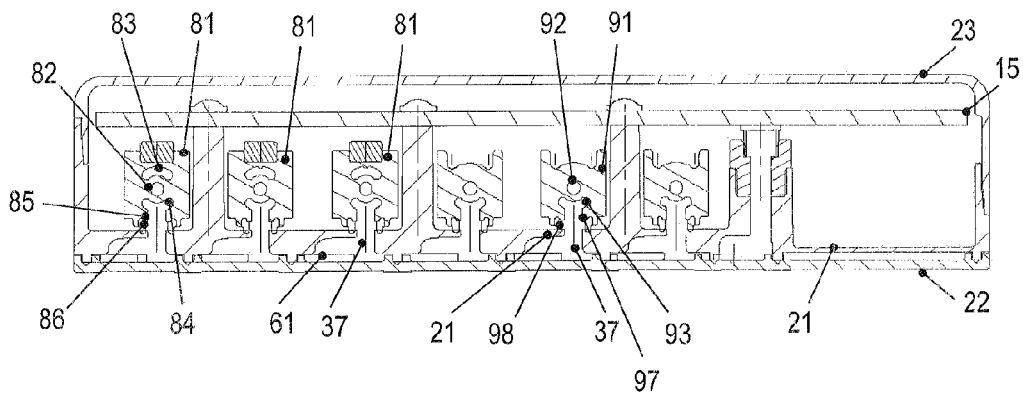
FIG. 7 is a cross-sectional view of the valve assembly of FIG. 2 along line VII-VII in FIG. 5.

FIG. 7 is a cross-sectional view through the valve assembly 10 taken along the line VII-VII indicated in FIG. 5. The first layer 21 and the second layer 22 in combination define a plurality of separate compartments in which respectively one of a plurality of first fluid channels 37 is arranged. A noise damper 61 is provided in the compartments so that fluid passing through the compartment is passed through or along the noise damper 61. The configuration of the noise damper 61 may be selected so as to attain desired time constants for inflating or deflating the associated inflatable fluid chamber.

The center portion 81 of a 3/3-way valve defines a channel 82 which is in direct fluid communication with a fluid inlet port of the valve which interfaces the fluid supply channel 70. The center portion 81 further defines a channel 83 extending across the fluid supply channel 70, at a distance from the fluid supply channel 70. The channel 83 allows fluid to pass between one of the first fluid channels 37 and one of the second fluid channels 47, which are disposed on opposite sides relative to the fluid supply channel 70. The center portion 81 further defines a channel 84 which is in fluid communication with the channel 83 via passages displaced relative to the section plane shown in FIG. 7. By energizing the 3/3-way valve, fluid may be allowed to pass between the channel 82 and the channels 83, 84.

The center portion 81 defines a port 85 of the valve which interfaces with the layered body. In FIG. 7, the fluid port 85 interfaces a first fluid channel 37 disposed on a first side relative to the fluid supply channel 70. A sealing member 86 is provided at the fluid port 85. The sealing member 86 may be attached to or formed integrally with the center portion 81 of the 3/3-way valve.

The center portion 91 of a pair 3/2-way valves defines a channel 92 which is in direct fluid communication with a fluid inlet port of the valve which interfaces the fluid supply channel 70. The center portion 91 further defines a channel 93 in direct fluid communication with one of the fluid channels 37 or 47 formed in the layered body. By energizing a 3/2-way valve, fluid may be allowed to pass between the channel 92 and the channel 93.

The center portion 91 defines, for each one of the 3/2-way valves, a port 97 which interfaces with the layered body. In FIG. 7, the fluid port 97 interfaces a first fluid channel 37 disposed on a first side relative to the fluid supply channel 70. The center portion 91 defines another port interfacing the other 3/2-way valve of the pair of valves with a second fluid channel 47 disposed on the second side relative to the fluid supply channel 70. A sealing member 98 is provided at the fluid port 97. The sealing member 98 may be attached to or formed integrally with the center portion 91 of the pair of 3/2-way valves.

The center portion 91 of a pair of 2/2-way valves may be formed as explained for the center portion 91 of a pair of 3/2-way valves. Further, a 3/2-way valve and a 2/2-way valve may also be combined into an integral unit with a center portion 91 extending therebetween.

Figure 8:
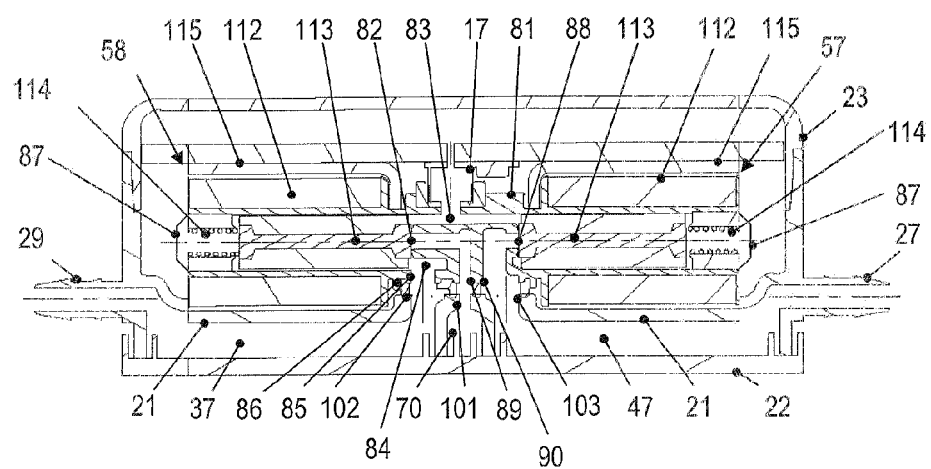
FIG. 8 is a cross-sectional view of the valve assembly of FIG. 2 in a direction perpendicular to the longitudinal axis of a fluid supply channel, the drawing plane passing through one 3/3-way valve.

FIG. 8 is a cross-section view through the valve assembly 10. The drawing plane of FIG. 8 is oriented orthogonally to a longitudinal axis of the linear portion of the fluid supply channel 70. The drawing plane is arranged such that it extends parallel to the axial direction of a 3/3-way valve.

The 3/3-way valve includes the two portion 57 and 58, which respectively have an electromagnetic actuator. For illustration rather than limitation, the electromagnetic actuator may comprise a solenoid. The solenoid may comprise a coil 112, an armature serving as valve body 113 moveable relative to the coil 112, and a bias member 114 biasing the valve body 113 into a normally closed position in which an end face of the valve body 113 abuts on the center portion 81. The bias member 114 of the portion 58 may bias the valve body 113 so that the channel 82 is closed by the valve body 113 when the electromagnetic actuator of the portion 57 is not energized. The bias member 114 of the portion 58 may bias the valve body 113 so that the channel 88 is closed by the valve body 113 when the electromagnetic actuator of the portion 57 is not energized. As illustrated, the electromagnetic actuator may further comprise a C-shaped metal frame 115 extending between the axial ends of the coil 112 for purposes of increasing magnetic field strength. Axial ends of the portions 57 and 58 may respectively be closed by a closure member 87 which prevents egress of fluid through these axial ends of the portions 57 and 58, respectively.

In use of the valve assembly, the connector 29 is connected to an inflatable fluid chamber via a fluid line, such as a hose. The opposite connector 27, which is disposed on the opposite side wall of the housing, serves as discharge port for discharging fluid when the inflatable fluid chamber is deflated.

The 3/3-way valve has three ports interfacing with the layered body. The 3/3-way valve has an inlet port 89 in direct fluid communication with the fluid supply channel 70. The 3/3-way valve has a fluid port 84 in direct fluid communication with one fluid channel defined by the layered body, which may be a fluid channel arranged in one of the first compartments 31-36 or in one of the second compartments 41-46. The 3/3-way valve has another fluid port 90 in direct fluid communication with one fluid channel defined by the layered body, which may be a fluid channel arranged in one of the first compartments 31-36 or in one of the second compartments 41-46. If the fluid port 84 is in direct fluid communication with a fluid channel 37 disposed in one of the first compartments 31-36, the fluid port 90 is in direct fluid communication with a fluid channel 47 disposed in one of the second compartments 41-46, or vice versa. In the configuration illustrated in FIG. 8, the fluid port 84 is in direct fluid communication with one of the fluid channels 37 arranged in one of the first compartments 31-36, and the fluid port 90 is in direct fluid communication with one of the fluid channels 47 disposed in one of the second compartments 41-46.

The layered body defines the supply passage 101 in the fluid supply channel 70, the first passage 102 allowing fluid to pass between the first fluid channel 37 and the 3/3-way valve and the second passage 103 allowing fluid to pass between the second fluid channel 47 and the 3/3-way valve. The supply passage 101 of the layered body is aligned with the inlet port 89 of the 3/3-way valve. The first passage 102 of the layered body is aligned with the fluid port 84 of the 3/3-way valve. The second passage 103 of the layered body is aligned with the fluid port 90 of the 3/3-way valve.

A sealing material 86 is interposed between the supply passage 101 and the fluid inlet port 89, between the first passage 102 and the fluid port 84, and between the second passage 103 and the fluid port 90. The sealing material 86 may be integrally formed with the center portion 81 of the 3/3-way valve. The sealing material 86 may also be formed separately. The sealing material 86 may be made from a material having a resiliency greater than that of the center portion 81 of the 3/3-way valve.

The center portion 81 of the 3/3-way valve further defines a recess engaging with the pressure sensor 17. The recess is in fluid communication with the channel 83. The pressure sensor 17 can be directly coupled with the 3/3-way valve, without requiring connection members separate from the 3/3-way valve and the pressure sensor 17. The channel 83 and the channel 84 of the center portion 81 of the 3/3-way valve remain in fluid communication even when the electromagnetic actuators of the 3/3-way valve are not energized. Thereby, a fluid communication between the inflatable fluid chamber associated with the 3/3-way valve and the channel 83 is maintained even when the solenoid in portion 58 is not energized. The configuration of the center portion 81 may be such that fluid, when passing between the connector 29 and the pressure sensor 17, does not pass narrow constrictions.

The pressure sensor 17 senses the pressure in the fluid chamber associated with the 3/3-way valve.

Further, when the electromagnetic actuator in portion 58 is actuated so as to establish fluid communication between the fluid supply channel 70 and the channel 83 via channel 82, the non-calibrated output signal provided by the pressure sensor 17 may be compared to an output signal provided by the calibrated pressure sensor 18. The pressure sensor 17 can be calibrated based on the comparison.

Operation of the 3/3-way valve will be described next. As previously mentioned, in the configuration shown in FIG. 8, the connector 29 is coupled to the inflatable fluid chamber and the connector 27 serves as exhaust opening. In operation, only one of the electromagnetic actuators of the 3/3-way valve is selectively operated at a time.

In order to increase the amount of fluid in the fluid chamber, the electromagnetic actuator in portion 58 is energized. The resulting movement of the valve body 113 in portion 58 establishes fluid communication between the channel 82, 83 and the channel 84. The pressure fluid source 7 is controlled so as to provide pressurized fluid to the fluid supply channel, so that the pressure in the fluid supply channel 70 exceeds the current pressure in the inflatable fluid chamber. Fluid is allowed to pass from the fluid supply channel 70 through the supply passage 101, the input port 89, channels 82 and 84, fluid port 85 and first passage 102 into the fluid channel 37. The fluid supplied by the pressure fluid source thus passes, from the 3/3-way valve, through the fluid channel defined by the layered body and through the connector 29 to the inflatable fluid chamber.

In order to hold constant the amount of fluid in the fluid chamber, neither one of the electromagnetic actuator in portion 57 or portion 58 is energized. The fluid channel 37 defined by the layered body remains in fluid communication with the inflatable fluid chamber. The valve body 113 of the portion 58 abuts on the center portion 81 so as to prevent egress of fluid into channel 82. The valve body 113 of the portion 57 abuts on the center portion 81 so as to prevent egress of fluid into channel 88. Thereby, egress of fluid through the 3/3-way valve is prevented and the amount of fluid is maintained at a constant level while neither one of the electromagnetic actuators in portions 57 and 58 is energized.

In order to decrease the amount of fluid in the fluid chamber, the electromagnetic actuator in portion 57 is energized. As previously mentioned, channel 84 and channel 83 formed in the center portion 81 of the 3/3-way valve are in direct fluid communication with each other. The channel 83 extending across the fluid supply channel 70 is therefore in fluid communication with the inflatable fluid chamber, via the fluid channel 37 defined by the layered body. When the solenoid in portion 57 is energized, the resulting movement of the valve body 113 in portion 57 establishes fluid communication between the channel 83 and the channel 88. Fluid is allowed to pass from the inflatable fluid chamber through the fluid channel 37 defined by the layered body, through the first passage 102, fluid port 85, the channel 84, the channel 83, the channel 88, fluid port 90, and the second passage 103 into the fluid channel 47. The fluid is then output via the connector 27. When the fluid chamber is deflated, fluid is made to pass through both the fluid channel 37 disposed on the first side relative to the fluid supply channel 70 and the fluid channel 47 disposed on the opposite second side relative to the fluid supply channel 70. The fluid is passed through or along a noise damper 61 in either one of the fluid channels 37 and 47, thereby reducing the noise level. Further, the rate of deflation may be adjusted by setting an appropriate fluid resistance.

While the 3/3-way valve is illustrated to be installed such that the fluid port 85 interfaces the first passage 102 and that the fluid port 90 interfaces the second passage 103, the 3/3-way valve may be configured such that it can also be installed in a different orientation. The 3/3-way valve may be configured such that the fluid ports 85 and 90 are arranged symmetrically relative to the inlet port 89. This allows the 3/3-way valve to be installed not only in the configuration shown in FIG. 8, but also in a configuration in which the 3/3-way valve has been rotated by 180° about the center axis of the inlet port 89 and/or the center axis of the supply passage 101. In this rotated configuration, the inflatable fluid chamber is to be connected to the connector 27, while the connector 29 on the opposite side wall serves as discharge opening. This flexibility afforded by a symmetric arrangement of the three ports of the 3/3-way valve allows the connectors to be flexibly assigned so that they can serve either as a connector connected to the associated inflatable fluid chamber or as an exhaust port for discharging fluid upon deflation of a fluid chamber. Thereby, excessive curvature in fluid lines and/or excessive fluid line lengths may be avoided.

Figure 9:
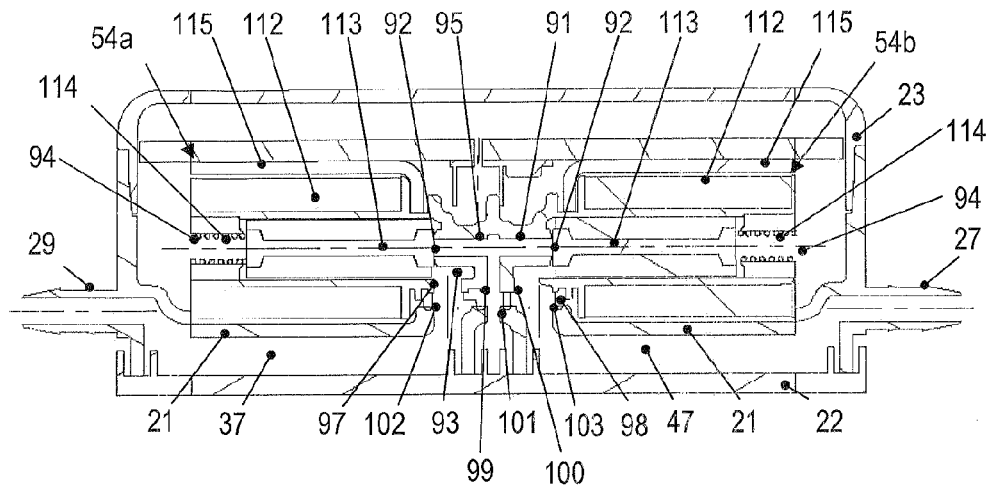
FIG. 9 is a cross-sectional view of the valve assembly of FIG. 2 in a direction perpendicular to the longitudinal axis of a fluid supply channel, the drawing plane passing through a pair of two 3/2-way valves.

FIG. 9 is a cross-section view through the valve assembly 10. The drawing plane of FIG. 9 is oriented orthogonally to a longitudinal axis of the linear portion of the fluid supply channel 70. The drawing plane is arranged such that it extends parallel to the axial direction of a pair of 3/2-way valves. Elements and features which correspond, with regard to their configuration and/or function to elements and features described with reference to FIGS. 1-8 are designated by the same reference numerals.

The pair of 3/2-way valves includes the a first 3/2-way valve 54a and a second 3/2-way valve 54b, which respectively have an electromagnetic actuator. For illustration rather than limitation, the electromagnetic actuator may comprise a solenoid. The solenoid may be configured as described with reference to FIG. 8. The bias member 114 of the first 3/2-way valve may bias the valve body 113 of the first 3/2-way valve 54a so that the channel 92 is closed by the valve body 113 when the electromagnetic actuator of the first 3/2-way valve 54a is not energized. The bias member 114 of the second 3/2-way valve 54b may bias the valve body 113 of the second 3/2-way valve 54b so that the channel 92 is closed by the valve body 113 when the electromagnetic actuator of the second 3/2-way valve 54b is not energized.

An axial end 94 of the first 3/2-way valve 54a and an axial end 94 of the second 3/2-way valve 94b are open and define a discharge port. The 3/2-way valves 54a and 54b are respectively configured such that, when the electromagnetic actuator is not energized, the channel 93 is in fluid communication with the open axial end 94 and that, when the electromagnetic actuator is energized, the valve body 113 is displaced and interrupts fluid communication between the channel 93 and the axial end 94 while establishing fluid communication between the channel 93 and the channel 92.

In use of the valve assembly, the connector 29 is connected to an inflatable fluid chamber via a fluid line, such as a hose. The opposite connector 27 is connected to another inflatable fluid chamber via a fluid line, such as a hose. The two fluid chambers may respectively be comprised by a massage unit.

The pair of 3/2-way valves has three ports interfacing with the layered body. The pair of 3/2-way valves has a fluid inlet port 99 in direct fluid communication with the fluid supply channel 70. The first 3/2-way valve 54a has a fluid port 97 in direct fluid communication with one fluid channel defined by the layered body, which may be a fluid channel arranged in one of the first compartments 31-36 or in one of the second compartments 41-46. The second 3/2-way valve 54b has another fluid port 100 in direct fluid communication with one fluid channel defined by the layered body, which may be a fluid channel arranged in one of the first compartments 31-36 or in one of the second compartments 41-46. If the fluid port 97 is in direct fluid communication with a fluid channel 37 disposed in one of the first compartments 31-36, the fluid port 100 of the other 3/2-way valve of the pair is in direct fluid communication with a fluid channel 47 disposed in one of the second compartments 41-46, or vice versa. In the configuration illustrated in FIG. 9, the fluid port 97 is in direct fluid communication with one of the fluid channels 37 arranged in one of the first compartments 31-36, and the fluid port 100 is in direct fluid communication with one of the fluid channels 47 disposed in one of the second compartments 41-46.

The supply passage 101 of the layered body is aligned with the fluid inlet port 99 of the pair of 3/2-way valves. The first passage 102 of the layered body is aligned with the fluid port 97 of the first 3/2-way valve. The second passage 103 of the layered body is aligned with the fluid port 100 of the second 3/2-way valve. The axial ends 94 of the first 3/2-way valve 54a and of the second 3/2-way valve 54b define further fluid ports of the respective valve.

A sealing material 98 is interposed between the supply passage 101 and the fluid inlet port 99, between the first passage 102 and the fluid port 97 of the first 3/2-way valve, and between the second passage 103 and the fluid port 100 of the second 3/2-way valve. The sealing material 98 may be integrally formed with the center portion 91 of the pair of 3/2-way valves. The sealing material 98 may also be formed separately from the center portion 91. The sealing material 98 may be made from a material having a resiliency greater than that of the center portion 91 of the pair of 3/2-way valves.

Operation of the pair of 3/2-way valves will be described next. As previously mentioned, in the configuration shown in FIG. 9, separate inflatable fluid chambers are coupled to the opposite connectors 29 and 27. The operation may be implemented such that only one of the electromagnetic actuator of the first 3/2-way valve and of the second 3/2-way valve is energized at a time. The two electromagnetic actuators may be controlled independently.

In the following, the operation of the first 3/2-way valve 54a will be described. The second 3/2-way valve 54b has an identical configuration and may be operated in an identical manner.

In order to increase the amount of fluid in the fluid chamber associated with the first 3/2-way valve 54a, the electromagnetic actuator of the first 3/2-way valve 54a is energized. The resulting movement of the valve body 113 of the first 3/2-way valve 54a establishes fluid communication between the channel 92 and the channel 93. The pressure fluid source 7 is controlled so as to provide pressurized fluid to the fluid supply channel 70, so that the pressure in the fluid supply channel 70 exceeds the current pressure in the inflatable fluid chamber. Fluid is allowed to pass from the fluid supply channel 70 through the supply passage 101, the input port 99, channels 92 and 93, fluid port 97 and first passage 102 into the fluid channel 37. The fluid supplied by the pressure fluid source 7 thus passes, from the first 3/2-way valve 54a, through the fluid channel 37 defined by the layered body and through the connector 29 towards the inflatable fluid chamber.

In order to decrease the amount of fluid in the fluid chamber, the electromagnetic actuator of the first 3/2-way valve 54a is not energized. The bias member 114 then biases the valve body 113 against the center portion 91 so as to interrupt the fluid communication between the fluid port 97 and the channel 92 of the first 3/2-way valve 54a. In this state, the fluid port 97 is in fluid communication with the port 94 of the first 3/2-way valve 54a. This allows fluid to pass between the fluid channel 37 formed in the layered body and the fluid port 94, through the first passage 102 and the fluid port 97. When the pressure in the inflatable fluid chamber exceeds ambient pressure, fluid is discharged from the inflatable fluid chamber via the first 3/2-way valve 54a until ambient pressure is reached. The fluid exits the first 3/2-way valve 54a through fluid port 94. The fluid port 94 is disposed within the housing. The fluid discharged from port 94 into the housing may serve to provide a cooling effect on solenoids, thereby reducing the risk that prohibitively high temperatures occur.

The fluid exiting the first 3/2-way valve 54a may be passed in the interior of the housing towards the through opening 75 formed in the first layer 21, as best seen in FIG. 3. The fluid passes through the noise damper compartment 74 and exits the housing of the valve assembly through the cut-outs 76. The noise damper compartment 74 has noise dampers 62, 63 arranged therein and defines a volume into which the fluid may expand. Thereby, noise levels may be reduced.

The inflatable fluid chamber associated with the first 3/2-way valve 54a may be selectively inflated or deflated. Similarly, the other fluid chamber associated with the second 3/2-way valve 54b may be selectively inflated or deflated. The electromagnetic actuators of the 3/2-way valves may respectively be energized in a repeating manner, in particular periodically. The electromagnetic actuator of the first 3/2-way valve 54a and the electromagnetic actuator of the second 3/2-way valve 54b may be energized in an alternating manner. Thereby, a massage-type inflation and deflation may be realized in the associated fluid chambers.

Figure 10:
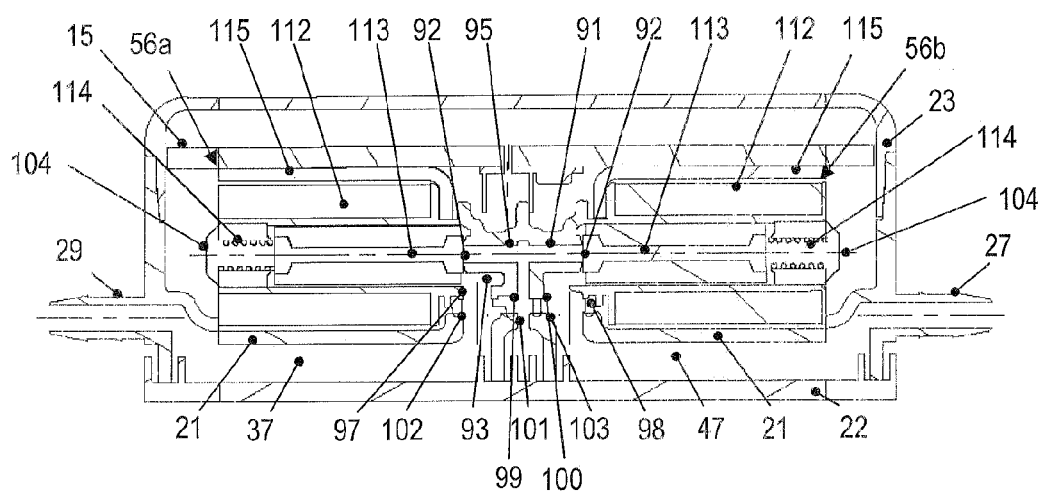
FIG. 10 is a cross-sectional view of the valve assembly of FIG. 2 in a direction perpendicular to the longitudinal axis of a fluid supply channel, the drawing plane passing through a pair of two 2/2-way valves.

FIG. 10 is a cross-section view through the valve assembly 10. The drawing plane of FIG. 10 is oriented orthogonally to a longitudinal axis of the linear portion of the fluid supply channel 70. The drawing plane is arranged such that it extends parallel to the axial direction of a pair of 2/2-way valves. The structure of the pair of 2/2-way valves is generally similar to the structure of the pair of 3/2-way valves. Elements and features which correspond, with regard to their configuration and/or function to elements and features described with reference to FIG. 9 are designated by the same reference numerals.

The pair of 2/2-way valves includes a first 2/2-way valve 56a and a second 2/2-way valve 56b. The 2/2-way valves 56a and 56b are respectively distinguished from the 3/2-way valves 54a, 54b in that they have axial ends closed by a closure member 104. The closure member 104 may have a configuration identical to that of the closure member 87 of the 3/3-way valve. When the electromagnetic actuator of the first 2/2-way valve 56a is not energized, the valve body 113 interrupts fluid communication between the channel 93 and the channel 92, so that fluid in the fluid channel 37 cannot exit through the 2/2-way valve 54a. This similarly applies to the second 2/2-way valve 56b.

The first 2/2-way valve 56a and the second 2/2-way valve may be used for various purposes. In an implementation, an inflatable fluid chamber is connected to at least one of the opposite connectors 27 and 29. The other one of the connectors may serve as a discharge opening when an inflatable fluid chamber is deflated or may be connected to another inflatable fluid chamber.

Operation of the pair of 2/2-way valves will be explained next. For illustration, it is assumed that the connector 29 which is in communication with the fluid port 97 of the first 2/2-way valve 56a is connected to an inflatable fluid chamber.

In order to increase the amount of fluid in the fluid chamber associated with the first 2/2-way valve 56a, the electromagnetic actuator of the first 2/2-way valve 56a is energized. The resulting movement of the valve body 113 of the first 2/2-way valve 56a establishes fluid communication between the channel 92 and the channel 93. The pressure fluid source 7 is controlled so as to provide pressurized fluid to the fluid supply channel 70, so that the pressure in the fluid supply channel 70 exceeds the current pressure in the inflatable fluid chamber. Fluid is allowed to pass from the fluid supply channel 70 through the supply passage 101, the input port 99, channels 92 and 93, fluid port 97 and first passage 102 into the fluid channel 37. The fluid supplied by the pressure fluid source thus passes, from the 2/2-way valve, through the fluid channel 37 defined by the layered body and through the connector 29 towards the inflatable fluid chamber.

In order to hold constant the amount of fluid in the fluid chamber associated with the first 2/2-way valve 56a, the electromagnetic actuator of the first 2/2-way valve 56a is no longer energized. The bias member 114 biases the valve body 113 against the center portion 91 of the pair of 2/2-way valves, such that fluid communication between the fluid port 97 and the channel 92 is interrupted.

In order to decrease the amount of fluid in the fluid chamber, the electromagnetic actuator of the first 2/2-way valve 56a is energized while the pressure in the fluid supply channel 70 is kept at a level smaller than the pressure in the inflatable fluid chamber connected to connector 29. This may be attained in various ways. In one implementation, the connector 27 in communication with the second 2/2-way valve 56b may not be connected to any inflatable fluid chamber, but may serve as a discharge opening. Energizing the electromagnetic actuator of the second 2/2-way valve 56b brings the fluid supply channel 70 to ambient pressure. By simultaneously energizing the electromagnetic actuator of the first 2/2-way valve 56a and the electromagnetic actuator of the second 2/2-way valve 56b, fluid is discharged from the inflatable fluid chamber via the first fluid channel 37, the first 2/2-way valve 56a, the fluid supply channel 70, the second 2/2-way valve 56b and the second fluid channel 47.

Alternatively or additionally, when the fluid chamber in communication with the first 2/2-way valve 56a is to be deflated while any other fluid chamber coupled to the valve assembly 10 is to be inflated, both the first 2/2-way valve 56a and the valve associated with the other fluid chamber which is to be inflated may be energized. The fluid from the fluid chamber in communication with the first 2/2-way valve 56a is then used to inflate the other fluid chamber.

When the valve assembly 10 includes several pairs of 2/2-way valves, it may be sufficient that only one of the different 2/2-way valves is associated with a connector 27 which serves as a discharge port. Fluid from the inflatable fluid chambers associated with other 2/2-way valves can then be reliably discharged via this one 2/2-way valve which can be used to controllably establish a fluid connection between the fluid supply channel 70 and the ambient atmosphere.

The valve assembly 10 may include several pairs of 2/2-way valves for increasing, holding constant or decreasing the amount of fluid introduced into the associated inflatable fluid chambers. For illustration, the valve assembly 10 may include a first pair of 2/2-way valves, a second pair of 2/2-way valves and a third pair of 2/2-way valves. The 2/2-way valves of the first pair of 2/2-way valves may be in fluid communication with right and left fluid chambers installed in lateral side portions of a lower seat portion, so that each one of the 2/2-way valves is in fluid communication with only one fluid chamber. The 2/2-way valves of the second pair of 2/2-way valves may be in fluid communication with fluid chambers installed in lateral side portions of a backrest portion, so that each one of the 2/2-way valves is in fluid communication with only one fluid chamber. The 2/2-way valves of the third pair of 2/2-way valves, or at least one of the 2/2-way valves of the third pair of 2/2-way valves, may have a port at ambient pressure for discharging fluid.

In operation, in order to inflate one of the fluid chambers installed in a seat or backrest side bolster, the associated 2/2-way valve of the first and/or second pair of 2/2-way valves is actuated while pressure fluid is supplied to the fluid supply channel 70. The 2/2-way valve(s) of the third pair of 2/2-way valves is not actuated, so that the fluid supply channel 70 is not in fluid communication with ambient pressure. In order to hold constant the amount of fluid introduced into the fluid chamber, the associated 2/2-way valve of the first and/or second pair of 2/2-way valves is not actuated, thereby interrupting fluid communication between the fluid chamber and the fluid supply channel 70. In order to decrease the amount of fluid introduced into the fluid chamber, the associated 2/2-way valve of the first or second pair of 2/2-way valves is actuated and at least one 2/2-way valve of the third pair of 2/2-way valves is actuated, so as to establish fluid communication between the fluid chamber and ambient pressure via the two actuated 2/2-way valves and via the fluid supply channel 70.

When the valve assembly includes one or several pairs of 2/2-way valves, a check valve may be provided to prevent fluid from flowing through the pump. The check valve may be integrated into the valve assembly. For illustration, the check valve may be integrated into the fluid supply channel 70. Alternatively, the check valve may also be integrated into the pump itself.

One or plural pairs of 2/2-way valves may be combined with other valves or other pairs of valves. For illustration, a valve assembly may include three 3/3-way valves, each of which is associated with respectively one of three inflatable fluid chambers of a lumbar support. The valve assembly may additionally include three pairs of 2/2-way valves for actuation of pairs of bladders which form side supports on a seat portion and backrest portion, respectively.

The 3/3-way valve, the pair of 3/2-way valves and the pair of 2/2-way valves may all be configured such that they have an identical arrangement of fluid ports interfacing with the layered body. This allows different combinations of 3/3-way valves, of pairs of 3/2-way valves and/or of 2/2-way valves to be combined in one valve assembly.

A valve assembly according to embodiments has been described. Other configurations may be implemented in other embodiments. For illustration, while electromagnetic actuators having a coil and a bias spring have been described, other electromagnetic actuators may be used.

The valve assembly of embodiments has a modular configuration which allows different types of valves to be combined in a flexible manner. The housing does not need to be adapted when different types of valves are assembled in the valve assembly. While a valve assembly including different types of valves has been described, the valve assembly according to embodiments does not need to include different types of valves. In other words, while the configuration of the layered body and of the various types of valves is such that different types of valves can be combined into one valve assembly in a flexible manner, it is not required that different valves are actually present in the valve assembly. For illustration, depending on customer's needs, the valve assembly may include only 3/3-way valves, or only 3/2-way valves, or only 2/2-way valves.

While valve assemblies have been described in which two 3/2-way valves are combined to form an integral unit or in which two 2/2-way valves are combined to form an integral unit, it is also possible to define other combinations of valves. For illustration, a 3/2-way valve configured as described with reference to FIG. 9 and a 2/2-way valve configured as described with reference to FIG. 10 may be combined to form an integral unit.

While valve assemblies have been described in which noise damper elements are integrated into the layered body, the noise damper elements may also be omitted.

While a housing has been described in which the connectors protrude from side walls in a direction approximately normal to the plane of the associated side wall, the connectors may also have a longitudinal axis disposed at an angle of less than 90° relative to the plane of the associated side wall, i.e., at an angle of greater than 0° relative to the normal of the plane of the associated side wall. Further the connectors may be provided with fixation elements which help secure a fluid line to the connector. Examples for such fixation elements include edges which bite into a fluid line when the fluid line is attached to the respective connector. The connectors may be arranged such that they extend at a small angle relative to the plane of the associated side wall. In an implementation, the connectors may even extend parallel to the associated side wall.

While a valve assembly having integrated pressure sensors has been described, the pressure sensor(s) may also be omitted from the valve assembly and may be provided separately.

Additional components may be integrated into the valve assembly or the seat adjusting device. For illustration, the valve assembly of an embodiment may include additional valves which are not connected to any one of the fluid channels defined by the layered body or which are only connected to the fluid supply channel.

While a configuration of the first layer and second layer of the layered body has been described in which opposite first and second compartments formed in the layered body are mirror-symmetric relative to a center plane of the fluid supply channel, the opposing first and second compartments may also be inversion-symmetric relative to an axis passing through the fluid supply channel and oriented to be orthogonal to the longitudinal axis of the linear portion of the fluid supply channel.

While exemplary embodiments have been described in the context of lumbar support adjustment, side support and/or massage units in a vehicle seat, the valve assembly according to various embodiments of the invention is not limited to this particular field of application. For illustration, embodiments of the invention may be used to control operation of one or several massage units. Generally, embodiments of the invention may be advantageously employed to supply fluid to various types of support and massage bladders in a wide variety of seats.

What is claimed is:
1. A valve assembly comprising:
a housing comprising a layered body, said layered body comprising a first layer and a second layer, said first layer and said second layer in combination defining a fluid supply channel, a first plurality of fluid channels and a second plurality of fluid channels, and
a plurality of valves disposed within said housing, each valve of said plurality of valves being in fluid communication with said fluid supply channel and respectively at least one fluid channel selected from said first plurality of fluid channels and said second plurality of fluid channels, said fluid supply channel, said first plurality of fluid channels and said second plurality of fluid channels being interposed between said first layer and said second layer, and said fluid supply channel partitioning said layered body such that said first plurality of fluid channels is arranged on a first side relative to said fluid supply channel and that said second plurality of fluid channels is arranged on a second side opposite to said first side relative to said fluid supply channel.

2. The valve assembly of claim 1, said plurality of valves comprising a 3/3-way valve and a pair of valves each valve of said pair of valves being selected from a group comprising a 3/2-way valve and a 2/2-way valve, said pair of valves having three fluid ports interfacing with said layered body, said 3/3-way valve having three fluid ports interfacing with said layered body, said fluid ports of said pair of valves and said fluid ports of said 3/3-way valve having identical geometrical arrangements.

3. The valve assembly of claim 2, said 3/3-way valve and said layered body being configured such that said 3/3-way valve is mountable in the housing in two different orientations distinguished by a 180° rotations of said 3/3-way valve.

4. The valve assembly of claim 1, said layered body having a plurality of mutually fluid-tight first compartments and a plurality of mutually fluid-tight second compartments, said first compartments having identical conformations and comprising respectively one of said first plurality of fluid channels, said second compartments having identical conformations and comprising respectively one of said second plurality of fluid channels, a first compartment selected from said plurality of first compartments and a second compartment selected from said plurality of second compartments being at least one of mirror-symmetric and inversion symmetric relative to said fluid supply channel.

5. The valve assembly of claim 1, said fluid supply channel having a linear portion, and each fluid channel of said first plurality of fluid channels and of said second plurality of fluid channels respectively having a linear portion extending transverse to said linear portion of said fluid supply channel.

6. The valve assembly of claim 1, said layered body further comprising noise dampers associated with said first plurality of fluid channels and said second plurality of fluid channels, said noise dampers being interposed between said first layer and said second layer of said layered body.

7. The valve assembly of claim 1, said plurality of valves comprising a valve having a first port in fluid communication with a first fluid channel selected from said first plurality of fluid channels and a second port in fluid communication with a second fluid channel selected from said second plurality of fluid channels.

8. The valve assembly of claim 1, said housing comprising a first side wall provided with a first plurality of connectors and a second side wall provided with a second plurality of connectors, said first and second side walls being spaced from each other, each connector of said first plurality of connectors being in fluid communication with respectively one of said first plurality of fluid channels, each connector of said second plurality of connectors being in fluid communication with respectively one of said second plurality of fluid channels, said first side wall and said second side wall being integrally formed with at least one of said first layer and said second layer of said layered body, said first layer and said second layer being joined together along a plurality of joining lines.

9. The valve assembly of claim 1, comprising a first pressure sensor in fluid communication with said fluid supply channel and at least one second pressure sensor in direct fluid communication with at least one valve of said plurality of valves, said first pressure sensor being a calibrated pressure sensor and said at least one second pressure sensor being a non-calibrated pressure sensor.

10. A pneumatic seat adjusting device, comprising the valve assembly of claim 1, and a plurality of inflatable fluid chambers connected to said valve assembly, each one of said inflatable fluid chambers being in fluid communication with respectively one fluid channel selected from said first plurality of fluid channels or said second plurality of fluid channels.

11. A seat comprising:

a seat portion, a backrest portion, and the seat adjusting device of claim 10, said plurality of inflatable fluid chambers being integrated into said seat portion and/or said backrest portion and forming at least one of an adjustable lumbar support, an adjustable side support and/or a massage unit.

12. A valve assembly comprising:

a housing comprising a layered body, said layered body comprising a first layer and a second layer, said first layer and said second layer in combination defining a fluid supply channel, a first plurality of fluid channels and a second plurality of fluid channels; and a plurality of valves disposed within said housing, each valve of said plurality of valves being in fluid communication with said fluid supply channel and respectively at least one fluid channel selected from said first plurality of fluid channels and said second plurality of fluid channels, said fluid supply channel, said first plurality of fluid channels and said second plurality of fluid channels being interposed between said first layer and said second layer, said fluid supply channel partitioning said layered body such that said first plurality of fluid channels is arranged on a first side relative to said fluid supply channel and that said second plurality of fluid channels is arranged on a second side opposite to said first side relative to said fluid supply channel, said layered body defining a plurality of supply passages respectively communicating said fluid supply channel to at least one valve of said plurality of valves, wherein, for each supply passage, the layered body defines an associated first passage communicating a valve of said at least one valve to a fluid channel selected from said first plurality of fluid channels, and an associated second passage communicating a valve of said at least one valve to a fluid channel selected from said second plurality of fluid channels, said associated first passage and said associated second passage being arranged symmetrically relative to said supply passage.

13. The valve assembly of claim 12,
said supply passage, said associated first passage, and said associated second passage having longitudinal axes which extend parallel to each other.

14. A valve assembly comprising:
a housing comprising a layered body, said layered body comprising a first layer and a second layer, said first layer and said second layer in combination defining a fluid supply channel, a first plurality of fluid channels and a second plurality of fluid channels; and
a plurality of valves disposed within said housing, each valve of said plurality of valves being in fluid communication with said fluid supply channel and respectively at least one fluid channel selected from said first plurality of fluid channels and said second plurality of fluid channels,
said fluid supply channel, said first plurality of fluid channels and said second plurality of fluid channels being interposed between said first layer and said second layer,
said fluid supply channel partitioning said layered body such that said first plurality of fluid channels is arranged on a first side relative to said fluid supply channel and that said second plurality of fluid channels is arranged on a second side opposite to said first side relative to said fluid supply channel,
said plurality of valves comprising a first valve and a second valve forming an integral unit,
said first valve comprising a fluid port in fluid communication with one of said first plurality of fluid channels,
said second valve comprising a fluid port in fluid communication with one of said second plurality of fluid channels, and
said first valve and said second valve comprising at least one inlet port in fluid communication with said fluid supply channel.

15. The valve assembly of claim 14,
said first valve being a 3/2-way valve and said second valve being a 3/2-way valve,
said first valve having a discharge port to discharge fluid from said one of said first plurality of fluid channels into a volume enclosed by said housing, and
said second valve having a discharge port to discharge fluid from said one of said second plurality of fluid channels into said volume enclosed by said housing.

* * * * *